United States Patent [19]

Reeves, Larry D. et al.

[11] Patent Number: 4,761,705
[45] Date of Patent: Aug. 2, 1988

[54] FAULT TOLERANT/FAILSAFE CURRENT UNIT

[75] Inventors: Reeves, Larry D., Palo Alto; Jay A. Zwagerman, Saratoga, both of Calif.

[73] Assignee: Tandem Computers Incorporated, Cupertino, Calif.

[21] Appl. No.: 39,562

[22] Filed: Apr. 16, 1987

[51] Int. Cl.[4] .............................................. H02H 3/08
[52] U.S. Cl. ...................................... 361/93; 307/31; 307/39
[58] Field of Search ..................... 361/93, 94; 307/11, 307/31, 38, 39

[56] References Cited

U.S. PATENT DOCUMENTS 4,325,009 4/1982 Molehouse et al. ................. 361/93
4,659,942 4/1987 Volp ...................................... 361/93

*Primary Examiner*—Philip A. Leung
*Assistant Examiner*—Jeffrey A. Gaffin
*Attorney, Agent, or Firm*—Townsend and Townsend

[57] ABSTRACT

A fault tolerant/failsafe current limit system for shutting down a power supply if an overcurrent condition exists at one or more selected load circuits in a set of load circuits. A current limit circuit couples each selected load circuit to the power supply and includes at least two monitoring circuits for detecting whether the current delivered to the selected load circuit exceeds a preselected limit. The power supply will be shut down unless both monitor circuits agree that the delivered current does not exceed the preselected limit.

3 Claims, 2 Drawing Sheets

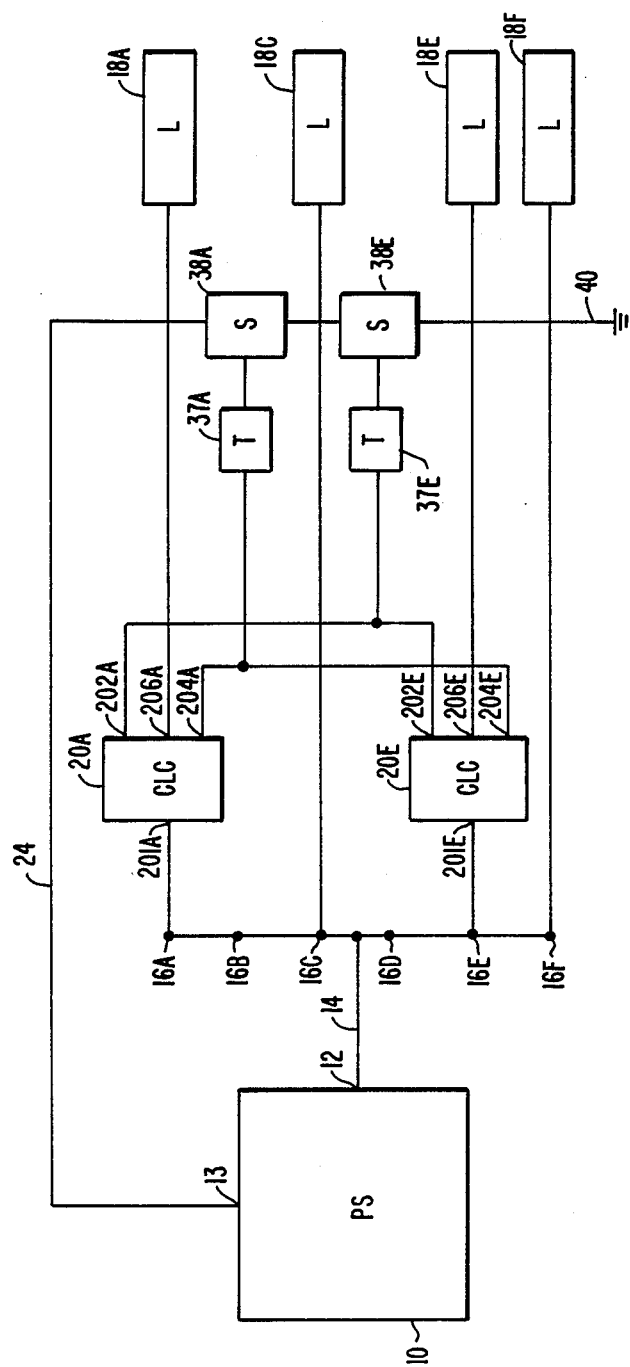
FIG._1.

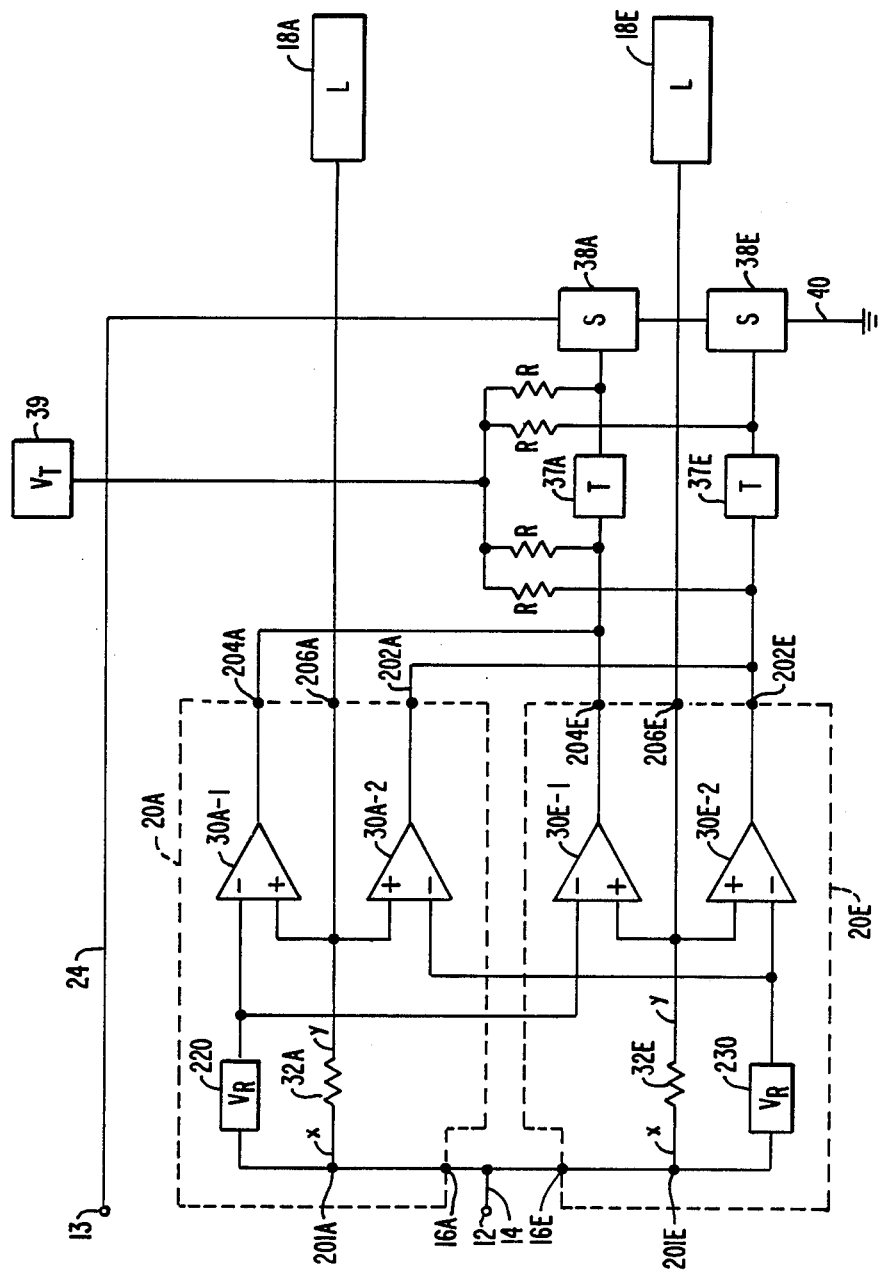
FIG._2.

FAULT TOLERANT/FAILSAFE CURRENT UNIT

BACKGROUND OF THE INVENTION

The ubiquitous presence of computers in modern life has created such a dependence on these machines that a computer malfunction can cause disruptions in such diverse areas as airline travel, payroll disbursements, and banking transactions. Accordingly, a significant engineering effort has been expended to design fault tolerant computers. A fault tolerant computer contains subsystems that continuously perform their intended function in spite of a single subsystem component failure.

Further, it is a design goal to make machines field serviceable so that repairs and modifications can be made by onsite personnel. Often, these personnel are not highly trained and regulatory agencies require that areas accessible to untrained personnel be protected by energy limit systems to prevent injury if a person accidentally creates a short circuit to ground. In a system having a fixed voltage supply, the energy limit system takes the form of current limit system. These overcurrent limit systems must be failsafe so that no single component failure in the system will result in an unsafe condition or a hazard to personnel. Thus, the concurrent requirements or reliability and safety impose different design constraints on the current limit system.

Typically, overcurrent limit circuits are included with the power supply itself. In some situations, the power supply provides power to a number of load circuits where some of the load circuits require overcurrent protection and others do not. An internal limit system monitors the sum of all the load currents and shuts off the power supply when this sum exceeds a predetermined limit. However, the power supply might be shut down when in fact the overcurrent condition was due to excessive current being drawn in a load circuit that did no require overcurrent protection and did not result in a hazard to personnel or unsafe condition. In this case, the power supply shut-off would have been unncessary. Conversely, an overcurrent could exist in a load current may not be detected because the sum of the load currents in all load circuits did not exceed the predetermined limit required to shut off the power supply.

Accordingly, a need exists for a current limit system that is fault tolerant and failsafe for all component failure modes and that can selectively bypass load circuits not requiring overcurrent protection.

BRIEF DESCRIPTION OF THE DRAWINGS

FIG. 1 is a block diagram of the overall layout of the present invention.

FIG. 2 is a schematic diagram of an embodiment of the current limit circuit.

SUMMARY OF THE INVENTION

A fault tolerant/failsafe current limit system includes a current limit circuit, comprising first and second monitor circuits that couple a power supply output terminal to an associated load circuit. The current limit circuit detects whether the current delivered to the associated load circuit from the power supply output terminal exceeds a selected limit. The power supply will be shut down unless both monitor circuits detect that the delivered current does not exceed the preselected limit.

According to one aspect of the invention, the power supply provides current to several load circuits, with only some requiring overcurrnt protection. The current limit circuits are only used to couple the load circuits requiring overcurrents protection to the power supply output terminals. Thus, the load circuits not requiring overcurrent protection may be selectively bypassed by the system. Unnecessary interruption of power is avoided in cases where high current is drawn by a load circuit that does not require overcurrent protection.

Other features and advantages of the invention will be apparent from the drawings and following detailed description.

DETAILED DESCRIPTION OF THE PREFERRED EMBODIMENT

Referring now to the figures, where like reference numerals indicate identical or corresponding parts throughout the everal views, in FIG. 1 a main power supply 10 supplies power to a power channel through power supply output port 12 and has an enable port 13. The output port 12 is coupled to a output bus 14 having, for example, six output terminals 16A, 16B, 16C, 16D, 16E, 16F. Each output terminal may be interconnected to a load circuit 18A, 18B, 18C, 18D, 18E, 18F. The first and fifth output terminals 16A and 16E are shown connected to their associated load circuits 18A and 18E by current limit circuits 20A and 20E. Each current limit circuit 20 incudes a CLC input port 201 coupled to an output terminal 16, and CLC output ports 202, 204 and 206. The enable port 13 is coupled to an enable circuit including an enable line 24 and series connected switches 38A and 38E. The switches 38A and 38E are coupled to the output ports 202 and 204 of current limit circuits 18 via timers 37A and 37E. CLC output port 206 is connected to load to 18.

The main power supply 10 is designed so that the current limit circuit 20A and 20E must pull the power enable signal low to cause the power supply output port 12 to be powered. If a high enable signal or open circuit condition is received at the power enable port 13, then the power supply channel will be turned off.

An overview of the operation of this system of FIG. 1 will now be described. As depicted, output terminal 16A and 16E are coupled to associated load circuits 18A and 18E by the current limit circuits 20A and 20E. In this case, it is assumed that load circuits 18A and 18E are field replaceable modules accessible by field personnel. Accordingly, these load circuits 18A and 18E require overcurrent limit protection.

The current limit circuit 20 monitors the current delivered to its associated load circuit 18 and maintains the state of the CLC output signal, generated at output ports 202 and 204, at a low level when the magnitude of the current is less than a preselected limit. Under normal conditions, power from power supply 10 is supplied to port 201 to CLC 20, and passes from port 206 of CLC 20 to load 18. However, if the delivered current exceeds the preselected limit the CLC output signal is driven high and a main power supply 10 is shut off. The VA (voltage x amps) of the preferred embodiment is equal to 108. For a six volt power supply the preselected current value is equal to 18 amps. Safety agencies generally set the VA limit at 240 volt-amps. In the preferred embodiment each load circuit is coupled to two power supplies to increase fault tolerance. Thus, the VA limit for each power supply is set at 108 volt-amps so that the maximum possible VA from both power supplies is 216 volt-amps, well below the required limit.

The advantages of the present invention are now apparent, the current limit function is tailored to the accessibility of the individual field replaceable current circuit boards 18. For example, the load 18C may not be accessible and thereby require no overcurrent protection. If the current limit circuit were internal to the power supply then a maximum estimate of the current drawn by this load would have to be summed with the required current limits of the accessible load circuits 18 to come up with a total current limit figure for shutting down the power supply 10. If the current drawn by load 18C exceeded this estimated limit, the power supply would be turned off when, in fact, no unsafe condition or hazard to personnel actually existed due to this excessive current requirements drawn into load 18C. Conversely, if the current requirements of 1 or more modules is lower than the estimated maximum (or zero, because the system as configured for the customer did not include a module), the power supply may not shut off when an hazardous overcurrent actually exists because the sum of all load currents did not reach the pre-determined value.

In the embodiment of FIG. 1, the current level drawn by load 18C does not affect the current limit function required by the accessibility of load circuits 18A and 18E.

FIG. 2 is a schematic diagram of an embodiment of a fault tolerant/failsafe current limit circuit. Referring now to FIG. 2, the current limit circuit 20A includes first and second monitor circuits 30A-1 and 30A-2. Both monitor circuits include a sense resistor 32A having a first terminal x coupled to the CLC input terminal 201A, and having a second terminal y connected to CLC terminal 206A. The first monitor circuit 30A-1 includes a reference voltage generator 220 having an input port coupled to the CLC input terminal 201A. A standard differential amplifier 30A-1 has its inverting input coupled to the output port of the voltage reference generator 220, and its non-inverting input coupled to the second terminal y of sense resistor 32A. The output port of the differential amplifier 30A-1 is coupled to the input port of a timer 37A with the output port of the timer 37A coupled to the control port of a two-state switch 38A. The second monitor circuit 30A-2 consists of identical components. An active voltage supply source 39 referenced to a ground terminal 40 provides the power required to operate the differential amplifiers, timers, and switches. The enable circuit is a series circuit comprising switches 38A and 38E.

The operation of the circuit of FIG. 2 will now be described. The reference voltage supplies 220 and 230 provides an output voltage equal to the input voltage $V_{in}$ minus a constant, $\Delta$. The magnitude of the sense resistor 32A, 32E is selected so that when the magnitude of the delivered current is less than the preselected limit the voltage drop across the sense resistor 32 is less than $\Delta$. Accordingly, the magnitude of the voltage level at the second terminal y of the sense resistor 32A, 32E is greater than the amplitude of the reference voltage when the magnitude of the delivered current is less than the preselected limit. In this case, the output of each differential amplifiers 30A-1 and 30A-2 positive. Each timer is set so that a positive signal received at the input port causes the timer to generate a control signal that holds the connected switch in the closed state. Thus, when the current is below the preselected limit, both switches 38A, 38E are closed and the enable line 24 is pulled low thereby maintaining the power supply in the powered condition.

If the magnitude of the delivered current exceeds the preselected limit, then the magnitude of the voltage drop across the sense resistor 32 is greater than $\Delta$ and voltage level at the second terminal 32B of the sense resistor is less than the reference voltage. In this case, the output of the differential amplifiers 30A-1 and 30A-2 is negative. When the timers 37A and 37E receive a negative signal the connected switches 38A and 38E are opened for a preselected time interval. During this preselected time interval the enable line 24 is isolated from ground 40 and power supply 10 is disabled from supplying power to output port 12. After the preselected time interval, the enable signal is driven to the active level by an active power supply 39. Active power supply 39 provides bias to the circuit of FIG. 2 by means of resistors R connected as shown. Thus, the power channel is shut down and a hazardous or unsafe condition is prevented.

The operation of the system in the case of a failure of differential amplifier 30A-1 willnow be analyzed. There are two possible failure modes of the first differential amplifier 30A-1. In the first failure mode, the monitor circuit indicates that no overcurrent condition exists where one actually exists. In the second failure mode, the monitor circuit indicates that an overcurrent condition exists when an overcurrent condition does not actually exist. As stated, the function of the current limit circuit is to shut down the power supply when an overcurrent condition exists in the monitored circuit. In the following analysis, assume that load 18A draws excess current.

For the first failure mode, the system is fault tolerant because the system continues to perform its intended function despite the failure of a single component, namely amplifier 30A-1. If no overcurrent condition exists, the power supply 20 remains on because both monitor circuits indicate that no overcurrent condition exists. If, however, an overcurrent condition occurs, the second amplifier 30A-2 will open the switch 38E thereby causing the enable signal to become active to turn off the power supply channel. Thus, the intended function of the circuit is achieved even though one of the components has failed.

For the second failure mode, the first amplifier 30A-1 will open the switch 37A so that the enable circuit becomes active and the power supply channel is shut down. This condition results in no unsafe condition or hazard and thus the failure mode is failsafe.

The key feature resulting in the fault tolerance/failsafe operation of this system is that the monitor circuit outputs are configured so that both monitor circuits 20A and 20E must agree that an overcurrent condition does not exist for the power supply channel to remain powered.

In the preferred embodiment, the ground terminal and active power supply sources 38 and 40 are both included in the main power supply.

The invention has now been described with reference to preferred embodiments. Substitution and modifications, within the scope of the invention, will now be apparent to skilled practitioners of the art. In particular, the actual circuitry of the monitor circuits may be modified provided that signals indicating whether or not an overcurrent condition exists are generated. Further, the particular enabling system of the power supply is not critical. Accordingly, the invention is not intended to be limited except as provided by the appended claims.

We claim:

1. In a system including a power supply having an output port coupled to a preselected number of output terminals, with each output terminal providing power to an associated load circuit, the power supply for supplying a fixed voltage to each load circuit, the power supply also including a ground terminal and a power enable port for receiving an enable signal and turning off the power supply when the enable signal is active, a fault tolerant/failsafe current limit system for preventing an overcurrent condition in a load circuit coupled to a selected output terminal comprising:

a first monitor circuit, external to the power supply and coupling a first output terminal to a first load circuit and supplying current thereto, for generating a first output signal in a first state if an overcurrent condition is detected and in a second state if no overcurrent condition is detected; and a second monitor circuit, external to the power supply and coupling a second output terminal to a second load circuit and supplying current thereto, for generating a first output signal in a first state if an overcurrent condition is detected and in a second state if no overcurrent condition is detected;

means, adapted to receive both monitor output signals, for shutting off the power supply to prevent an overcurrent condition unless both monitor circuit output signals are in the second state.

2. In a system including a power supply having an output port coupled to a preselected number of output terminals, with each output terminal providing power to an associated load circuit, the power supply for supplying a fixed voltage to each load circuit, the power supply also including a ground terminal and a power enable port for receiving an enable signal and turning off the power supply when the enable signal is active, a fault tolerant/failsafe current limit system for preventing an overcurrent condition in a load circuit coupled to a selected output terminal comprising:

a voltage source, coupled to the power enable port, for supplying an active signal to the power enable port;

first and second switches, connected in series between the enable port and said ground terminal, for connecting said enable port to ground when both switches are open thereby enabling the power supply;

a first monitor circuit, coupling the selected output terminal to its associated load circuit, for monitoring the current delivered to the associated load circuit, for maintaining said first switch in a closed position when the amount of delivered current is below a predetermined amount, and for opening said first switch when the amount of delivered current exceeds the predetermined amount; and a second monitor circuit, coupling the selected output terminal to the associated load circuit, for monitoring the currnt delivered to said associated load circuit, for maintaining said second switch in a closed position when the amount of delivered current is below the predetermined amount, and for opening said second switch when the amount or delivered current exceeds the predetermined amount;

whereby the current limit system is fault tolerant for a first failure mode where one of said monitor circuits indicates that no overcurrent condition exists where one actually exists because the other monitor circuit will open its associated switch to shut down the power supply if a overcurrent condition occurs thereby allowing the current limit system to function in spite of a single component failure and whereby the current limit system is failsafe for a second failure mode when one of said monitor circuits indicates an overcurrent condition when one does not actually exist because the faulty monitor circuit will open its associated switch to shut down the power supply so that the second failure mode will not cause an unsafe condition.

3. The invention of claim 2, further including timing means connected between each said monitor circuit and each said switch, for causing each said switch to close after a predetermined length of time;

whereby if the amount of said delivered overcurrent is below a predetermined amount, said power supply is automatically enabled, and if said delivered overcurrent is above a predetermined amount, one of said monitor circuits will cause one of said switches to open, disabling said power supply.

* * * * *